United States Patent
Fukuzaki et al.

(10) Patent No.: US 12,508,843 B2
(45) Date of Patent: Dec. 30, 2025

(54) TIRE

(71) Applicant: BRIDGESTONE CORPORATION, Tokyo (JP)

(72) Inventors: Sho Fukuzaki, Tokyo (JP); Yuya Suda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/715,225

(22) PCT Filed: Oct. 17, 2022

(86) PCT No.: PCT/JP2022/038504
§ 371 (c)(1),
(2) Date: May 31, 2024

(87) PCT Pub. No.: WO2023/100505
PCT Pub. Date: Jun. 8, 2023

(65) Prior Publication Data
US 2025/0026152 A1      Jan. 23, 2025

(30) Foreign Application Priority Data

Dec. 3, 2021  (JP) .................................. 2021-196955

(51) Int. Cl.
| | | |
|---|---|---|
| *B60C 11/00* | (2006.01) | |
| *B60C 11/01* | (2006.01) | |
| *B60C 11/13* | (2006.01) | |
| *B60C 11/03* | (2006.01) | |

(52) U.S. Cl.
CPC .......... *B60C 11/01* (2013.01); *B60C 11/1376* (2013.01); *B60C 2011/0358* (2013.01); *B60C 2200/04* (2013.01)

(58) Field of Classification Search
CPC .................................................. B60C 11/1376
See application file for complete search history.

(56) References Cited

U.S. PATENT DOCUMENTS

| | | | |
|---|---|---|---|
| 6,076,579 A * | 6/2000 | Matsumoto | ............. B60C 11/11 |
| | | | 152/209.15 |
| 2013/0240101 A1 | 9/2013 | Kameda | |
| 2016/0009143 A1 | 1/2016 | Kobayashi | |

(Continued)

FOREIGN PATENT DOCUMENTS

| | | | |
|---|---|---|---|
| JP | 06-191234 A | * | 7/1994 |
| JP | 7-101209 A | | 4/1995 |

(Continued)

OTHER PUBLICATIONS

Machine translation for Japan 06-191234 (Year: 2025).*

(Continued)

*Primary Examiner* — Steven D Maki
(74) *Attorney, Agent, or Firm* — Sughrue Mion, PLLC

(57) ABSTRACT

In the pneumatic tire, at least a portion including outside end in a tire width direction of a ground contacted surface of the block is a round toward a tire radial direction inside as the portion toward the tire width direction outside. The height difference from a peak portion of tire radial direction most outside of the block to outside end in the tire width direction of at least one of the blocks varies with a width of the block.

5 Claims, 4 Drawing Sheets

(56) References Cited

U.S. PATENT DOCUMENTS

| | | |
|---|---|---|
| 2016/0236518 A1* | 8/2016 | Sugiyasu ............ B60C 11/1376 |
| 2016/0272011 A1 | 9/2016 | Onabe et al. |
| 2019/0217667 A1 | 7/2019 | Sakamoto |
| 2019/0225022 A1 | 7/2019 | Sakamoto |
| 2019/0232723 A1 | 8/2019 | Sakamoto |
| 2021/0122195 A1 | 4/2021 | Tomomatsu |

FOREIGN PATENT DOCUMENTS

| | | | |
|---|---|---|---|
| JP | 2001-287510 A | | 10/2001 |
| JP | 2012-17008 A | | 1/2012 |
| JP | 2012-140072 A | * | 7/2012 |
| JP | 2013-189121 A | | 9/2013 |
| JP | 2015-81024 A | | 4/2015 |
| JP | 2016-22758 A | | 2/2016 |
| JP | 2016-22850 A | | 2/2016 |
| JP | 2017-19398 A | | 1/2017 |
| JP | 2019-127063 A | | 8/2019 |
| WO | 2014/148260 A1 | | 9/2014 |
| WO | 2020/009049 A1 | | 1/2020 |

OTHER PUBLICATIONS

Machine translation for Japan 2012-140072 (Year: 2025).*
International Search Report for PCT/JP2022/038504 dated Dec. 20, 2022.
Written Opinion for PCT/JP2022/038504 dated Dec. 20, 2022.
Extended European Search Report issued Feb. 12, 2025 in Application No. 22900939.4.

* cited by examiner

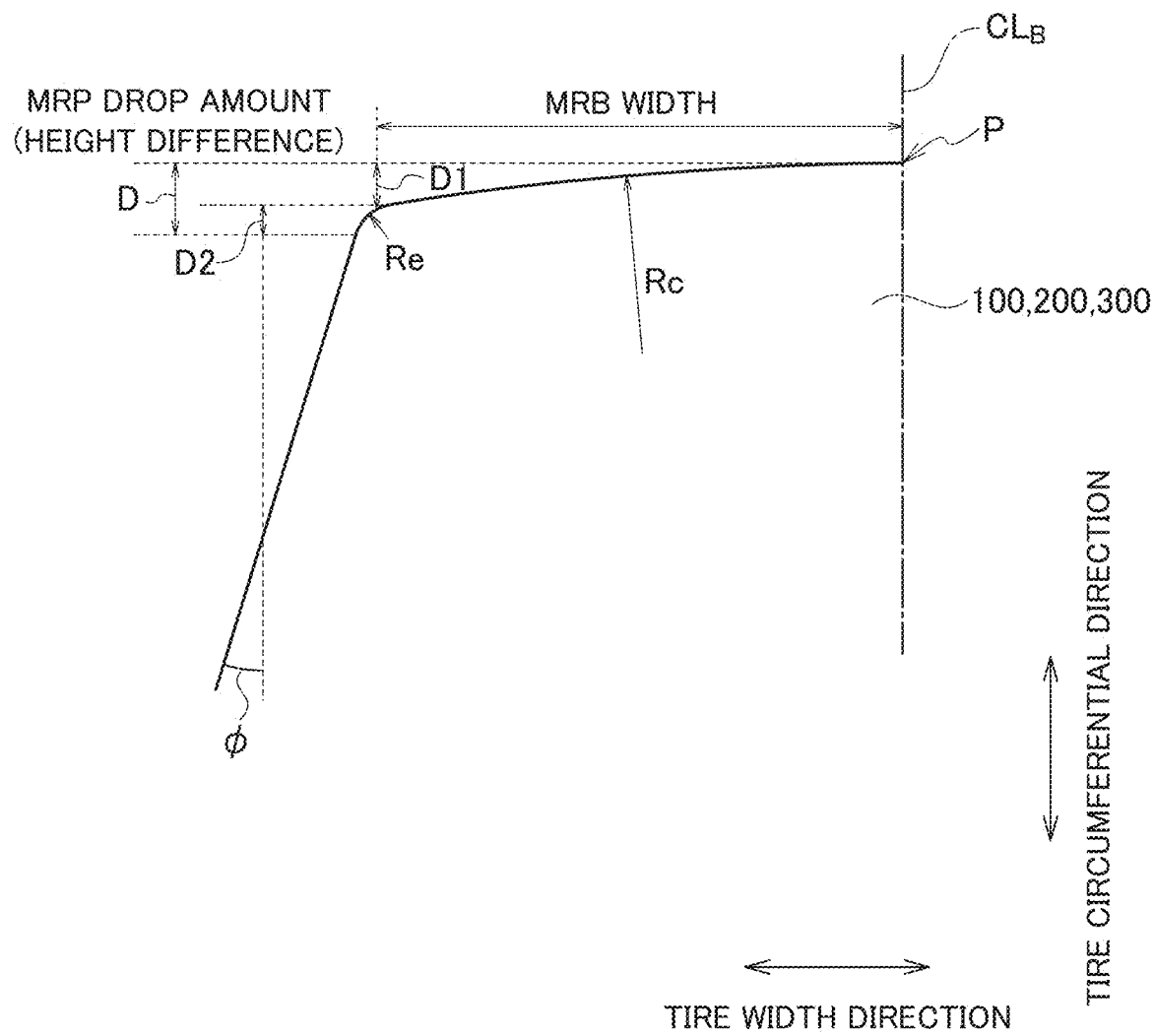

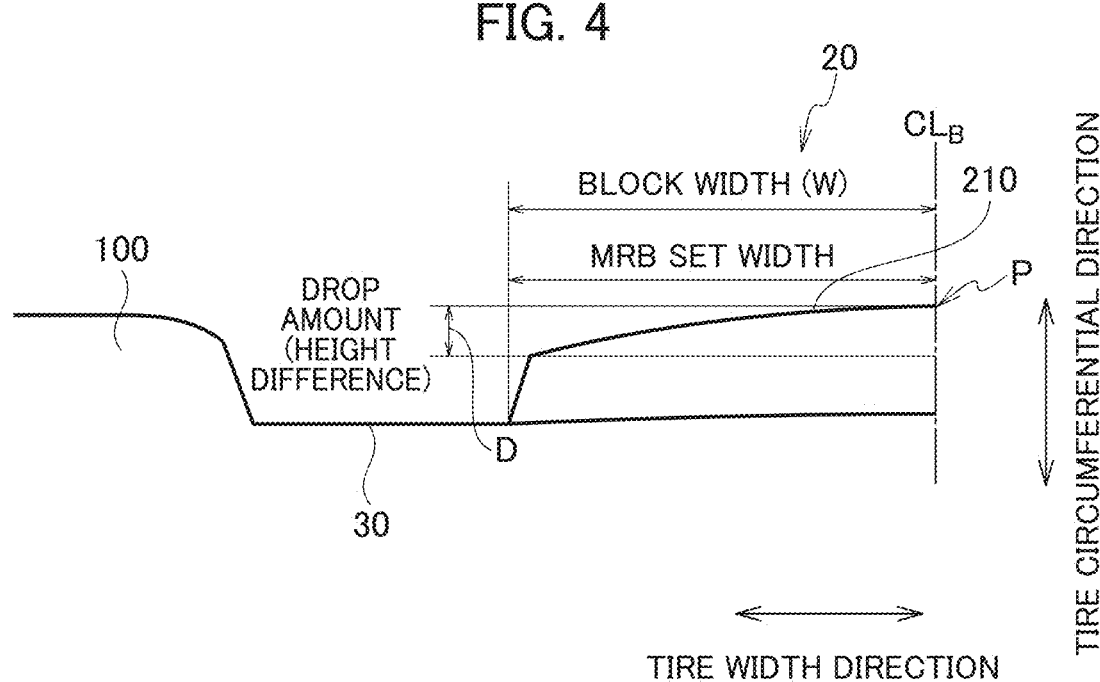
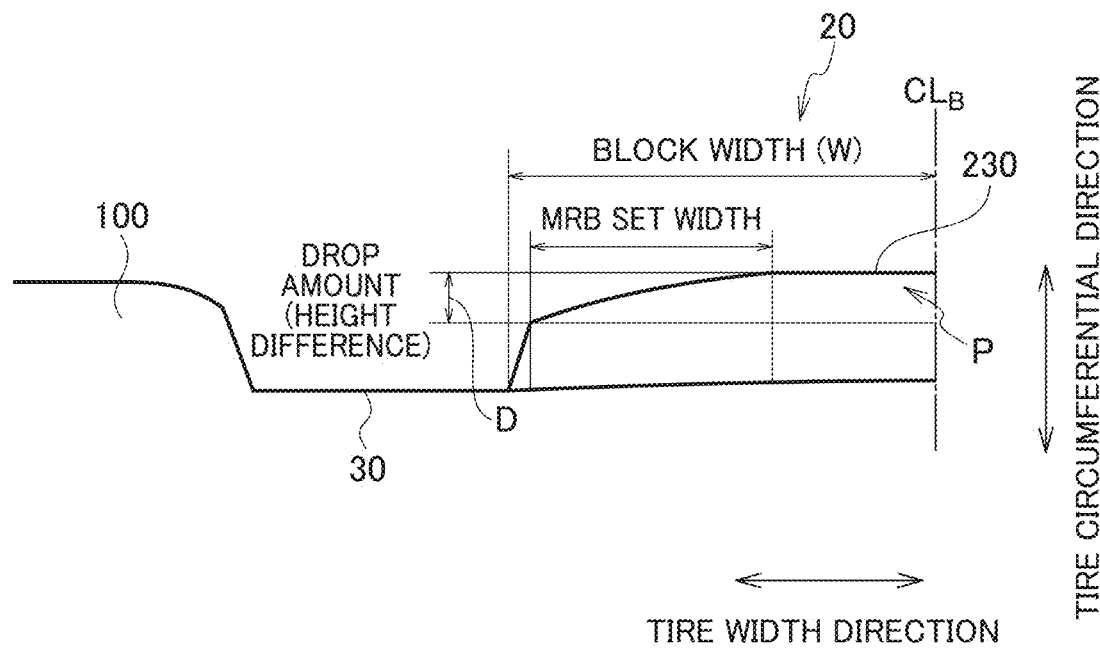

TIRE

CROSS REFERENCE TO RELATED APPLICATIONS

This application is a National Stage of International Application No. PCT/JP2022/038504 filed Oct. 17, 2022, claiming priority based on Japan Patent Application No. 2021-196955 filed Dec. 3, 2021.

TECHNICAL FIELD

The present disclosure relates to a tire having a land block having a round-shaped cross section along a tire width direction.

BACKGROUND ART

Conventionally, in order to improve vehicle dynamics on a wet road surface without lowering vehicle dynamics on a dry road surface, a tire having a land block having a round-shaped cross section along a tire width direction (may simply be called a block) is known (Patent Literature 1).

With a tire having such a block, vehicle dynamics on a dry road surface and a wet road surface can be compatible with each other at a high level because the drainability can be improved without lowering the block rigidity.

CITATION LIST

Patent Literature

[Patent Literature 1] WO 2014/148260

SUMMARY OF INVENTION

However, when the block shape is complicated, for example, when the block width varies in the direction of the tire width, it is not easy to reconcile vehicle dynamics on a dry road surface and a wet road surface in a high dimension.

Therefore, the following disclosure is made in view of such a situation, and it is an object of the present invention to provide a tire capable of reconciling vehicle dynamics on a dry road surface and a wet road surface in a high dimension even when the block shape is complicated, for example, when the block width varies in the direction of the tire width.

One aspect of the present disclosure is a tire (pneumatic tire 10) provided with a tread (tread 20) formed with a plurality of blocks (center block 100, second block 200 and shoulder block 300), wherein in a cross section in along a tire width direction and a tire radial direction, at least a portion including outside end in a tire width direction of a ground contacted surface of the block is a round toward a tire radial direction inside as the portion toward the tire width direction outside, and a height difference from a peak portion of tire radial direction most outside of the block to outside end in the tire width direction of at least one of the blocks varies with a width of the block.

BRIEF DESCRIPTION OF DRAWINGS

FIG. 3 is a schematic section shape of a center block 100, a second block 200 and a shoulder block 300 along a tire width direction and along a tire radial direction.

FIG. 4 is a cross-sectional view of the tread 20 including the second block 200 (narrow region 210).

FIG. 5 is a cross-sectional view of the tread 20 including the second block 200 (wide region 230).

DESCRIPTION OF EMBODIMENTS

Figure 1:
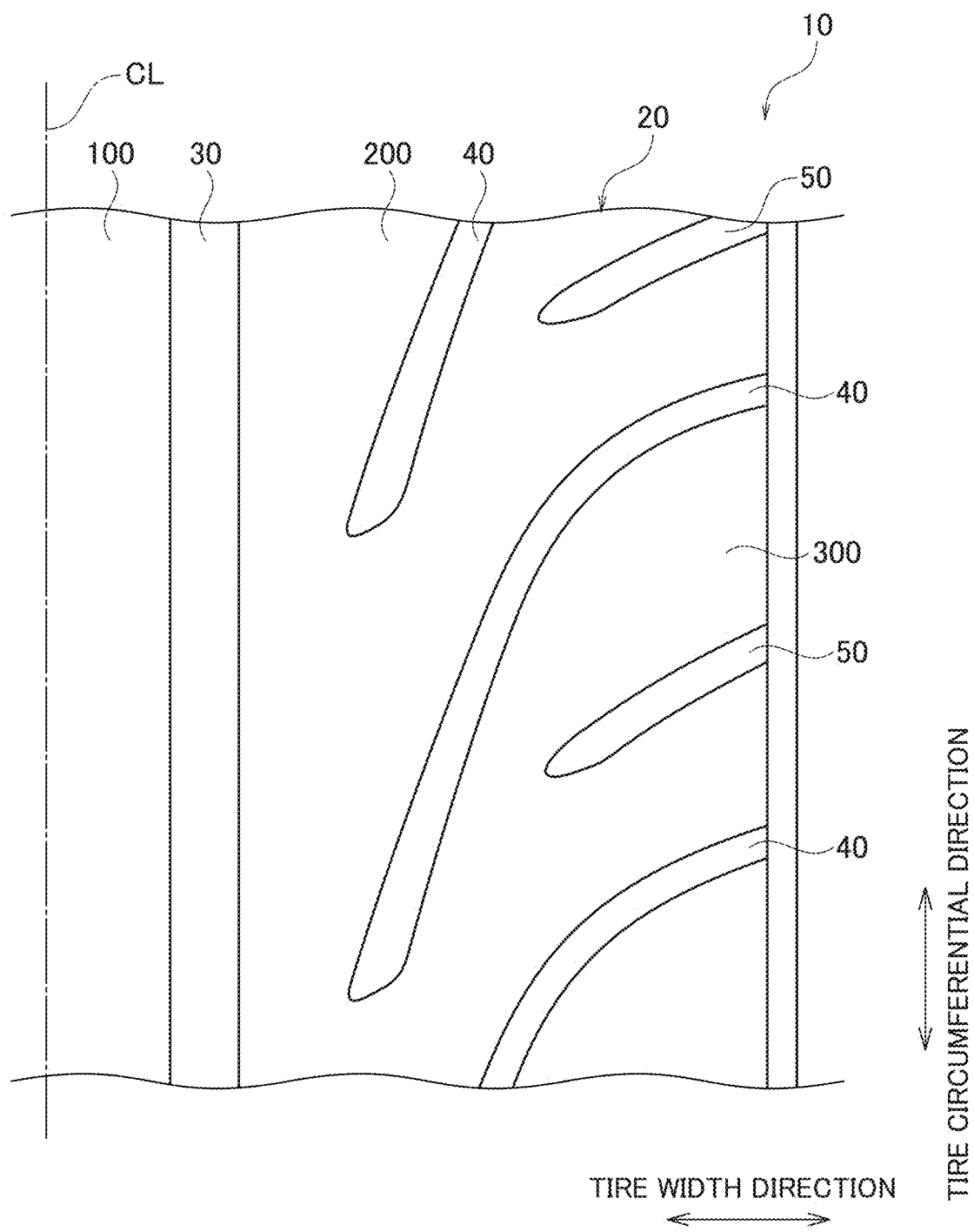
FIG. 1 is a partial plan view of a tread of a pneumatic tire 10.

Hereinafter, the embodiment will be described based on the drawings. The same functions and structures are denoted by the same or similar reference numerals, and the description thereof will be omitted accordingly.

(1) OVERALL SCHEMATIC STRUCTURE OF TIRE

FIG. 1 is a partial plan view of a tread 20 of a pneumatic tire 10 according to the present embodiment. As shown in FIG. 1, the pneumatic tire 10 includes the tread 20 on which a plurality of blocks (land blocks) are formed. In FIG. 1, only one side in the tire width direction relative to a tire equatorial line CL is shown. The pneumatic tire 10 has a symmetrical shape relative to the tire equatorial line CL.

The pneumatic tire 10 may be used for a four-wheeled standard passenger car, but particularly for a high-performance automobile with a high vehicle dynamics.

The tread 20 is in contact with the road surface. A pattern is formed on the tread 20 according to the use environment of the pneumatic tire 10 and the type of the vehicle to be mounted.

Specifically, a circumferential groove 30, an inclined groove 40 and a lug groove 50 are formed on the tread 20. The circumferential groove 30 is formed near the tire equatorial line CL. The circumferential groove 30 is a straight groove extending in the tire circumferential direction.

The inclined groove 40 extends in an inclined manner in the tire width direction and the tire circumferential direction. Although the inclined angle of the inclined groove 40 is not particularly limited, an appropriate inclined angle may be set in consideration of the draining property required for the pneumatic tire 10. The inclined groove 40 may be curved toward the shoulder side of the tread 20 as it towards the tire width direction outside, and the inclined groove 40 may extend to the shoulder of the tread 20.

The lug groove 50 extends along the tire width direction and is shorter in length than the inclined groove 40. The lug groove 50 may extend along the tire width direction rather than the tire circumferential direction and may not necessarily extend parallel to the tire width direction. The lug groove 50 may also extend to the shoulder of the tread 20.

A plurality of blocks divided by the circumferential groove 30, the inclined groove 40 and the lug groove 50 are formed on the tread 20. Specifically, a center block 100, a second block 200 and a shoulder block 300 are formed on the tread 20.

The center block 100 is a rib-shaped block formed in a region including the tire equatorial line CL. The center block 100 is divided by the circumferential groove 30.

The second block 200 is formed in the tire width direction outside of the center block 100. The second block 200 is divided by the circumferential groove 30 and the inclined groove 40.

The shoulder block 300 is formed in the tire width direction outside of the second block 200. The shoulder block 300 is divided by the inclined groove 40 and the lug groove 50.

Although not shown, the pneumatic tire 10 may be formed by a carcass, a crossing belt, various belt reinforcing layers, a bead portion, etc. A structure in which a cord made of polyethylene terephthalate is spirally wound continuously in the tire circumferential direction may be applied to the belt reinforcing layer, and the cord is preferably formed by applying an adhesive treatment under a tension of $6.9 \times 10^{-2}$ N/tex or more, and the elastic modulus at 29.4 N load measured at 160° C. is preferably 2.5 mN/dtex·% or more.

Figure 2:
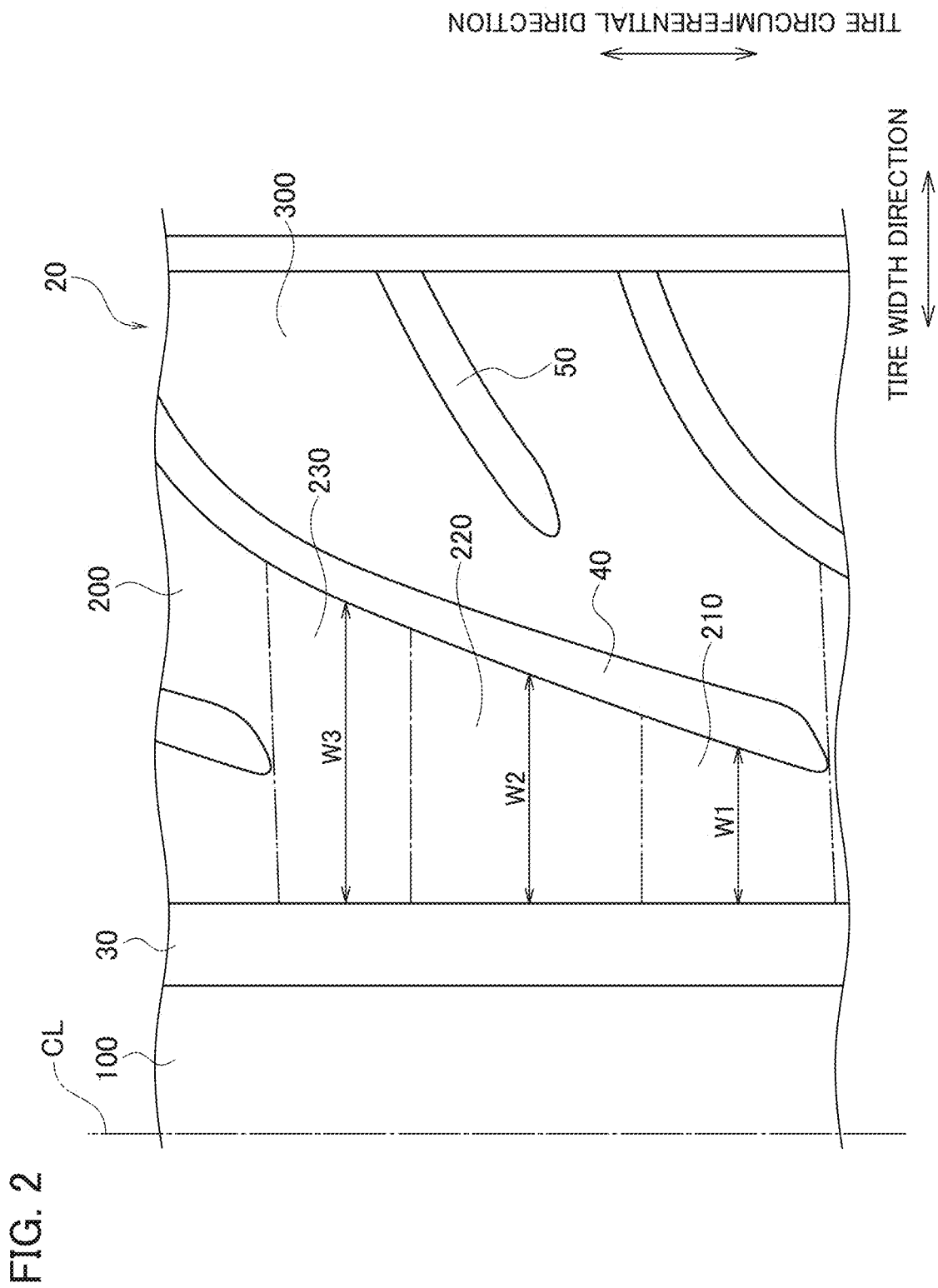
FIG. 2 is a partially enlarged plan view of a tread 20.

FIG. 2 is a partially enlarged plan view of the tread 20. As described above, the second block 200 is divided by the circumferential groove 30 and the inclined groove 40, so that the width of the second block 200 varies in the tire circumferential direction.

Specifically, the second block 200 has a narrow region 210, an intermediate width region 220, and a wide region 230.

The narrow region 210 is a region having a narrow width (block width) along the tire width direction in the second block 200. The narrow region 210 may be a region having a predetermined width (W1) or less.

The intermediate width region 220 is a region having an intermediate block width in the second block 200.

The intermediate width region 220 may be a region of a predetermined width (W2) or less.

The wide region 230 is a region having a wide block width in the second block 200. The wide region 230 may be a region having a predetermined width (W3) or less.

The narrow region 210, the intermediate width region 220, and the wide region 230 may be divided based on the block width. For example, a region having a block width of less than 30 mm may be defined as the narrow region 210, a region having a block width of 30 mm or more and 45 mm or less may be defined as the intermediate width region 220, and a region having a block width of 45 mm or more may be defined as the wide region 230.

Note that W1, W2, and W3 have a relationship of W1<W2<W3, and may be the average width in each region, or may be the width of a specific position in the tire circumferential direction of each region.

(2) SECTION SHAPE OF THE BLOCK

Next, the section shape of the block, specifically, the section shape of the center block 100, the second block 200 and the shoulder block 300 will be described.

FIG. 3 is a schematic diagram of the section shape of the block according to the present embodiment. Specifically, FIG. 3 shows a schematic section shape of the center block 100, the second block 200 and the shoulder block 300 (hereinafter abbreviated as block as appropriate) along the tire width direction and tire radial direction.

As shown in FIG. 3, the ground contacted surface (tread surface) of the block is round. Specifically, as shown in FIG. 3, in the cross section along the tire width direction and the tire radial direction, at least a portion including outside end in the tire width direction of the ground contacted surface of the block is round toward the tire radial direction inside as it towards the tire width direction toward outside.

That is, in the cross section along the tire width direction and the tire radial direction, the outer rim shape of the block has a peak portion P at the position of the most outside of tire radial direction and is convex to the tire radial direction outside.

More specifically, the outer rim shape of the block may be formed by a plurality of parts having different radius of curvature. Such a block may be specifically called a multi-round block (MRB).

The MRB may be defined as Rc<Re when the convex shape of the ground contacted surface of the block consists of a convex curve in which a plurality of curved sections having a predetermined curvature are smoothly connected, the curvature of the central curved section including the central section of the ground contacted surface (the area including a block equator line $C_{LB}$) is Rc, and the curvature of the end curved section including the end of the ground contacted surface is Re, and the curvature of the curved section located between the central curved section and the end curved section is within the range from Rc to Re.

Further, in the present embodiment, the height difference D from the peak portion P of tire radial direction most outside of the block to outside end in the tire width direction of at least one of the blocks may vary with the width of the block (W1, W2 and W3 shown in FIG. 2). The position of the peak portion P may vary in the tire width direction according to the block width, but the position of the peak portion P need not vary sharply according to the block width and may vary gently to avoid becoming a wear core.

The height difference D may be interpreted as the height difference along tire radial direction from the bottom of the groove adjacent to the block. The height difference D may be referred to as the block drop (MRB drop). The height difference D may be represented by the sum of the height difference D1 in the region of Rc and the height difference D2 in the Re region. The side wall of the block may be inclined at a predetermined angle (ϕ) with respect to the tire radial direction.

FIG. 4 shows the cross-sectional shape of the tread 20 including the second block 200 (narrow region 210). FIG. 5 shows the cross-sectional shape of the tread 20 including the second block 200 (wide region 230).

The height difference D varies with the width of the block. Specifically, the height difference D may increase as the width of the block increases. The specific value of the height difference D is not particularly limited and may be determined according to the curvature of the MRB, the level of drainability required for the pneumatic tire 10, the tire life (Groove depth of circumferential groove 30, inclined groove 40, etc.), and the like. Generally, the height difference D may be set within a range of a few millimeters or less.

As shown in FIG. 4, when the width of the block is a predetermined value (For example, W1) or less, the height difference D may be constant regardless of the width of the block. When the width of the block (narrow region 210) is a predetermined value or less, as shown in FIG. 4, the block (narrow region 210) may be round over the entire block in the tire width direction. That is, in the narrow region 210, the position of the block equator line $C_{LB}$ is the peak portion P, and the curvature may be applied over the entire block in the tire width direction (MRB setting width in FIG. 4).

On the other hand, if the width of the block exceeds a predetermined value (For example, W3), the block (wide region 230) may be round in a portion of the block including outside end in the tire width direction of the ground contacted surface of the block. That is, in the wide region 230, a region of predetermined width including the position of the block equator line $C_{LB}$ is the peak portion P, and curvature may be applied to a portion of the block in the tire width direction outside (MRB setting width in the figure). As shown in FIG. 5, when a region of predetermined width including the position of the block equator line $C_{LB}$ is the peak portion P, the MRB setting width may be relative to outside end of the peak portion P in the tire width direction in the block.

When the width of the block is equal to or greater than a predetermined value (For example, W2), the height difference D may be constant regardless of the width of the block. Furthermore, the height difference D may vary with the width of the round-shaped portion (portion being rounded) of the block along the tire width direction. That is, the height difference D may vary according to the MRB setting width.

For the center block 100 and the shoulder block 300, the MRB may be set based on the same technical concept as for the second block 200. For example, for the center block 100, the same MRB setting as for the narrow region 210 may be applied, and for the shoulder block 300, the same MRB setting as for the intermediate width region 220 may be applied. In addition, the MRB setting may not be applied to the second block 200, but only to the center block 100 and/or the shoulder block 300.

(3) FUNCTION AND EFFECTS

In the pneumatic tire 10 described above, the height difference D from the peak portion P of tire radial direction most outside of the block to outside end in the tire width direction of at least one of the blocks varies with the width of the block. Specifically, the height difference D may vary with the width along the tire width direction of the round-shaped portion of the block.

More specifically, the height difference D increases as the block width (For example, W1, W2, W3 shown in FIG. 2, etc.) increases.

Therefore, even when the block width varies in the tire width direction, a sufficient load can be applied near the peak portion P of the block, and the loss of ground pressure can be effectively suppressed. Without a sufficient height difference D (drop amount), after the internal pressure is set to the pneumatic tire 10, due to the rigidity step difference caused by the difference in tread rubber gauge between the edge of groove and block (land portion), the wider the block width, the greater the deformation of the tread rubber in areas where the gauge is thin, and the ground pressure is easily concentrated at the edge portion of the block.

According to the pneumatic tire 10, the concentration of the ground pressure at the edge portion of such a block can be reduced regardless of the block width, and thus the loss of the ground pressure can be suppressed. As a result, the ground pressure near the peak portion P can be increased, and the water film remaining between the tread and the road surface can be suppressed when running on a wet road surface.

As a result, high drainability can be ensured regardless of the block width.

That is, according to the pneumatic tire 10, even when the block shape is complicated such as the block width varies in the tire width direction, vehicle dynamics on the dry road surface and the wet road surface can be compatible with each other in a high dimension.

In this embodiment, when the block width is a predetermined value (For example, W1) or less, the height difference D may be constant regardless of the block width. This is because if the height difference D is provided too much even though the block width is narrow, the effect of the ground pressure loss suppression may be reduced.

In addition, when the block width is a predetermined value (For example, W1) or less, the block may be round over the entire block in the tire width direction. Thus, the ground pressure near the peak portion P can be effectively increased.

On the other hand, if the width of the block exceeds a predetermined value (For example, W3), the block may be round-shaped in a portion of the block including outside end in the tire width direction of the ground contacted surface of the block. Thus, in the case of a wide block, the grounding property and the drainability can be improved by ensuring a sufficient area of the peak portion P which is flat without any curvature.

In this embodiment, when the width of the block is equal to or greater than a predetermined value (For example, W2), the height difference D may be constant regardless of the width of the block. This is because if the height difference D is provided too much even though the width of the block is wide, ground contact area of the block will be reduced, thereby impairing the grounding property and the drainability.

(4) OTHER EMBODIMENTS

Although the embodiments have been described above, they are not limited to the description of the embodiments, and it is obvious to those skilled in the art that various modifications and improvements can be made.

For example, in the pneumatic tire 10, the circumferential groove 30, the inclined groove 40 and the lug groove 50 are formed, but a part of such a groove may not be formed. That is, in the case of the pneumatic tire where a block is formed such that the block width varies in the tire circumferential direction, the MRB setting as described above may be applied.

In addition, although the pneumatic tire 10 had a symmetrical tread pattern with respect to the tire equatorial line CL, it is not limited to such a tread pattern, and an asymmetrical tread pattern may be applied with respect to the tire equatorial line CL.

Although the present disclosure has been described in detail, it is clear to those skilled in the art that the present disclosure is not limited to the embodiments described herein. The present disclosure may be implemented in a modified and modified manner without departing from the object and scope of the present disclosure as determined by the description of the scope of claims. Accordingly, the description of the present disclosure is for illustrative purposes and does not have any restrictive meaning to the present disclosure.

REFERENCE SIGNS LIST

10 Pneumatic tire
20 Tread
30 Circumferential groove
40 Inclined groove
50 Lug groove
100 Center block
200 Second block
210 narrow region
220 intermediate width region
230 wide region
300 Shoulder block
CL Tire equatorial line
P Peak portion

The invention claimed is:

1. A tire provided with a tread formed with a plurality of blocks, wherein in a cross section in along a tire width direction and a tire radial direction, at least a portion including outside end in a tire width direction of a ground contacted surface of each of the blocks is a round toward a tire radial direction inside as the portion toward the tire width direction outside, and a height difference from a peak portion of tire radial direction most outside of each of the blocks to outside end in the tire width direction of each of the blocks varies with a width of each of the blocks, the peak portion in the tire width direction varies with a width of each of the blocks, when the width of each of the blocks is equal to or less than 30 mm, the height difference is constant regardless of the width of each of the blocks, when the width of at least one of the plurality of blocks exceeds 45 mm, the height difference is constant regardless of the width of each of the blocks.

2. The tire according to claim 1, wherein the height difference increases as the width of each of the blocks increases.

3. The tire according to claim 1, wherein when the width of each of the blocks is equal to or less than a predetermined value, each of the blocks is round over the entire block in the tire width direction.

4. The tire according to claim 1, wherein when the width of each of the blocks exceeds a predetermined value, each of the blocks is round in a portion of each of the blocks including the tire width outside end of the ground contacted surface of the block.

5. The tire according to claim 1, wherein the height difference varies with a width along the tire width direction of the portion being rounded.

* * * * *